US006205154B1

(12) United States Patent
Schmidt et al.

(10) Patent No.: US 6,205,154 B1
(45) Date of Patent: Mar. 20, 2001

(54) AUTOMATIC PATH SELECTION FOR FIBER-OPTIC TRANSMISSION NETWORKS

(75) Inventors: Barnet M. Schmidt, Oradell; Peter M. Winkler, Madison, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/834,265

(22) Filed: Apr. 15, 1997

(51) Int. Cl.[7] .............................. H04L 12/43; H04J 3/16
(52) U.S. Cl. ................................. 370/458; 370/468
(58) Field of Search ................................... 370/351, 358, 370/369, 375, 376, 403, 404, 431, 433, 437, 442, 443, 444, 458, 468, 907, 347, 348, 460

(56) References Cited

U.S. PATENT DOCUMENTS

| 5,345,441 | * | 9/1994 | Paker et al. | 370/358 |
| 5,345,446 | * | 9/1994 | Hiller et al. | 370/358 |
| 5,351,236 | * | 9/1994 | Pawelski | 370/358 |
| 5,412,652 | * | 5/1995 | Lu | 370/907 |
| 5,546,400 | * | 8/1996 | Hironaka | 370/358 |

\* cited by examiner

*Primary Examiner*—Chau Nguyen
*Assistant Examiner*—Chiho Andrew Lee
(74) *Attorney, Agent, or Firm*—Gibbons, Del Deo, Dolan, Griffinger & Vecchione

(57) ABSTRACT

A system and method for providing automatic path selection in a fiber-optic transmission network. The system provides efficient utilization of available bandwidth with respect to T1, T3 and STS-3c service requests. A time slot is selected from the available time slots in a maximally utilized and efficient manner in response to a type of service request. The time slot is then assigned to the service request to provide a transmission pathway. In response to a T1 service request, the system finds the most occupied time slot which has an available assignable time slot. If a new unoccupied time slot is required or the request is for a T3 or a STS-3c service, the system selects an unoccupied time slot in accordance with a prioritized order of contiguous unoccupied time slots.

29 Claims, 4 Drawing Sheets

AUTOMATIC PATH SELECTION FOR FIBER-OPTIC TRANSMISSION NETWORKS

FIELD OF THE INVENTION

This invention relates to the field of telecommunication systems, and more particularly to automatic path selection for fiber-optic transmission systems.

BACKGROUND OF THE INVENTION

Existing fiber-optic communications networks are typically based on a time-sharing technique whereby time slots in a time frame are assigned to different terminals that generate communications traffic. A great many network protocols for time-sharing within such networks have been disclosed in the prior art, where these protocols are known as time division multiple access ("TDMA") protocols.

One standard implementation of the TDMA approach used in fiber-optic based networks is known as SONET ("Synchronous Optical Network"). SONET uses a simple time multiplexing technique to accommodate increasing numbers of SONET terminals and provides the flexibility needed to transport many digital signals with different capacities.

A major drawback of current systems utilizing SONET transmission facilities is that the user is required to manually enter or specify which time slots are to be used for a requested service. For example, system users may use a GUI ("Graphical User Interface") to specify to an EMS ("Element Management System") which time slots are to be used for the desired service. If, for example, a system user wishes to provision a T1 service between two nodes of a SONET network, the user must enter the time slots (e.g., STS number, VT group, and VT1.5 identifications) into the system so that the system can cross connect the time slots through each node, thus providing the requested path. Additionally, the user must provision T1 ports at each node so that the system may command the network elements to drop the selected time slots at the desired ports. In addition to the disadvantage of manual entry, this approach results in the inefficient utilization and fragmentation of the available bandwidth, as the users are not aware of which time slots are unoccupied in the STS channels and will use whatever time slot they are accustomed to use or is immediately available.

Accordingly, there is a need to provide an automatic system and supporting methods, both being selectively engageable to assign time slots within fiber-optic TDM transmission networks to various services in accordance with a predetermined scheme such that the system provides automatic path selection to the users, avoids bandwidth fragmentation, and optimal bandwidth utilization.

SUMMARY OF THE INVENTION

In accordance with the present invention, a system and method is described which provides users with automatic path selection capability, where time slots within SONET facilities are automatically assigned utilizing a predesigned selection criteria in response to a communications service request. When a user has requested the system to assign an end-to-end path through the SONET network, the system will use the methodology of the present invention to automatically select the time slots that will be needed to cross-connect through each optical facility to provide an end-to-end path which optimizes available bandwidth. The present invention thus provides a significant enhancement over the manual entry method of prior art systems.

In one embodiment of the present invention system, the user specifies the facility level to be provisioned (e.g., a T1, T3, or STS-3c service), and the identification of the add/drop nodes, which is where traffic is entered on and off the network. Based upon this input, the system will then select using a two-fold slot selection process, the time slots within each intemodal optical facility and cross-connect those time slots at each node via message sequences, thus providing automatic end-to-end path selection.

The present invention method solves bandwidth fragmentation and optimizes bandwidth utilization by selecting a time slot which maximizes the remaining bandwidth with respect to a future T1, T3 or STS-3c service request. For example, as STS-1 time slots become unavailable by assigning their bandwidth to specific services, a next VT1.5 time slot to be assigned for a T1 service request would be that in the most fully assigned or occupied STS-1 time slot which has the required availability. If a new unoccupied STS-1 time slot is required or the service request is for a T3 or a STS-3c service, then the system selects an unoccupied STS-1 time slot with reference to the number of contiguous unoccupied STS-1 time slots in the system. These time slot selection criteria assure that the available bandwidth is assigned in an efficient and systematic manner so as to avoid unusable or fragmented time slots.

BRIEF DESCRIPTION OF THE DRAWINGS

A more complete understanding of the present invention may be obtained from consideration of the following description in conjunction with the drawings in which.

DETAILED DESCRIPTION

Figure 1:
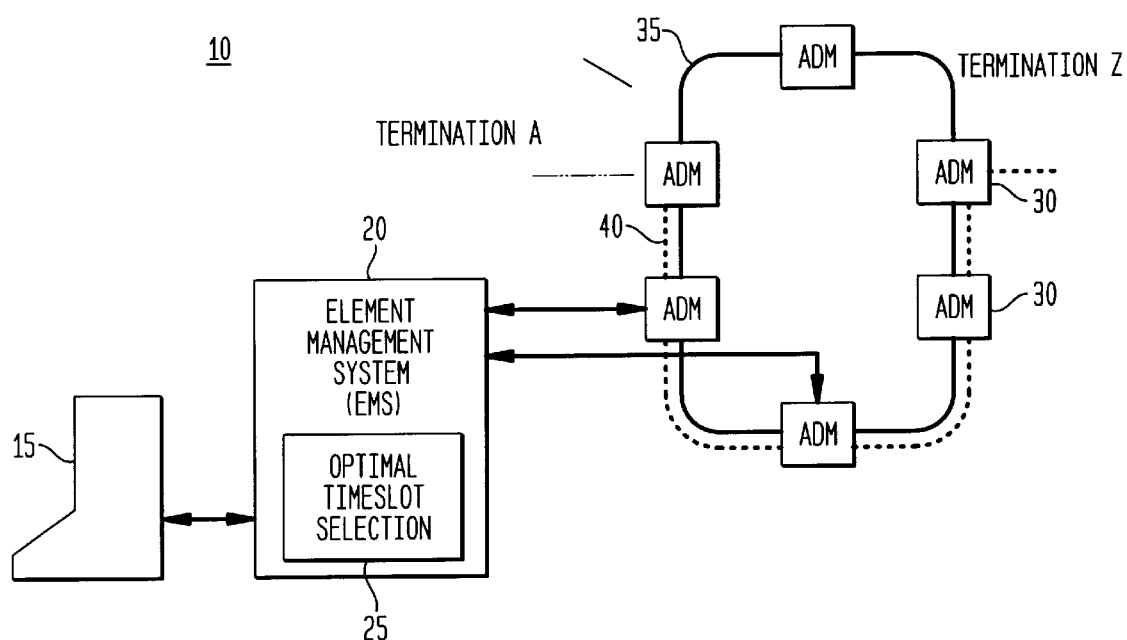
FIG. 1 is a system diagram for a SONET network in accordance with the present invention.

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 2–4 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

The present invention is a system and method for automatically assigning time slots within SONET transmission facilities in response to varying service requests. Although specifically described with respect to SONET networks, it would be understood that the present invention is generally applicable to broadband transmission networks. In general, the present invention automatically selects time slots within each optical carrier in response to a user request for an end-to-end path. The ability to provide automatic path selection in this manner provides a significant commercial advantage over the prior art systems, which require manual selection and entry. In the present system, the user indicates a facility level to be provisioned (e.g., a T1, T3, or STS-3c service), and the identification of add/drop nodes. The system will then select the time slots within each intermodal optical facility and cross-connect those time slots at each node. In the exemplary embodiment, cross connections are carried via TL1 ("Transaction Language 1") message sequences, the ITU-T's ("International Telecommunication Union—Telecommunication sector") machine to machine communications language, thus providing automatic path selection and connection.

The present invention method is what is termed as a best fit method and addresses the problems of dynamic storage allocation in SONET networks. Dynamic storage allocation methods address the necessity for assigning space as service requests arrive, and the spontaneous termination of items subsequent to storage. If the method addresses only the former issue, it is a problem of bin packing. Often, bin packing and dynamic storage allocation methods fall into one of two categories, first fit and best fit. In a first fit method, each item is placed in the lowest numbered bin in which it fits. The best fit solution places each item in the fullest bin in which it fits. As stated above, the present invention method uses a variant of the latter type approach.

The basic rate at which SONET operates is STS-1 ("Synchronous Transport Signal" Level-1), which supports data transmission at 51.84 Mbits/s. The optical counterpart of STS-1 is OC-1 ("Optical Carrier" Level-1). In SONET networks, higher transmission rates are direct multiples of the basic rate, for instance, STS-48/OC-48 is 48 times STS-1/OC-1 or 2.48 Gbits/s. SONET transmission equipment interleaves STS-1 channels with other STS-1 channels in simple integer multiples to form a synchronous high speed signal which carries multiple service requests. This functionality permits easy access to lower speed signals, such as T1 (a rate of 1.544 Mbps in North America) and T3 (a rate of 44.736 Mbps globally), without multi-stage multiplexing or demultiplexing. In SONET networks, the lower speed signals are mapped into sub-STS-1 signals called Virtual Tributaries ("VT"). VTs are sub-SONET bandwidth structures which are designed for the transporting and switching of sub-T3 (below 44.736 Mbps) loads. These VTs can be easily combined or concatenated for transmission of various types of services through a network. For example, an STS-1 channel is defined as having 28 VT1.5 channels, each channel having the capacity to carry a T1 service.

More specifically, an OC-N SONET facility is divided into N STS-1 time slots, each of which comprises 28 VT1.5 time slots. The STS-1 time slots are ordered 1 through N, where N can be as high as 48. Each T1 service is carried by a single VT1.5 time slot in a single STS-1 time slot. A T3 service requires a single STS-1 time slot and a STS-3c service requires three contiguous STS-1 time slots. Altogether the SONET facility can carry as many as 28 N T1's, N T3's or N/3 STS-3c's, or various combinations of these services.

In addition to automatic path selection, the present invention prevents bandwidth fragmentation and optimizes bandwidth utilization by selecting the time slot which maximizes time slot assignment with reference to T1, T3 and STS-3c service requests. In general, the present invention accomplishes this using a two-fold time slot selection process. For example, in a first part of the two-fold selection process the system will select, in response to a T1 request, an unoccupied VT1.5 time slot in the most-occupied STS-1 time slot. This indicates that as STS-1 time slots become occupied, i.e., their corresponding bandwidth is assigned to various requested services, the next VT1.5 time slot to be assigned would be that in the next most fully-assigned STS-1 time slot. In this sense, most fully-assigned (or most fully-occupied) STS-1 time slot implies that the STS-1 time slot has an available VT1.5 time slot. As a second part of the two-fold selection process, if no partially occupied STS-1 time slots are available and a new STS-1 time slot has to be assigned (or a T3 or STS-3c service is requested) then the system will select a STS-1 time slot with reference to the number of contiguous unoccupied STS-1 time slots. This two-fold time slot selection criteria assures that the available OC-N bandwidth, where N is the number of STS-1s, is assigned in a manner so as to avoid unusable or fragmented time slots.

Unusable or fragmented time slots occur when time slots are selected on a first-come basis, in a sequential order, or in a random order. Note that the sequential order method would avoid fragmentation if all the requests are of the same bandwidth. However, in practice the assignments are not limited to only one bandwidth. For example, assigning a VT1.5 time slot for a specified service renders that specific STS-1 time slot unassignable for a future T3 or a STS-3c service, since a fraction of the STS-1 time slot's bandwidth has already been assigned. Thus if subsequent T1-to-VT1.5 assignments are made without regard to the bandwidth already utilized (that is, on a first-come or a random basis), then there will be many partially-occupied STS-1 time slots that cannot be assigned for subsequent T3 or STS-3c services. The effective capacity of the OC-N facility will therefore be significantly lower than had the assignments been made in a manner so as to reduce the fragmentation. That is, the actual usable bandwidth of the OC-N facility will be less, perhaps substantially less, than the total OC-N bandwidth available. As such, the basis of the efficient time slot assignment method is to assign VT1.5 time slots from the most-occupied STS-1 time slot first and select new STS-1 time slots by maximizing use with reference to T3 and STS-3c assignments.

Referring to FIG. 1, a SONET network 10 is described which utilizes an automatic path selection method in accordance with the present invention. SONET network 10 includes a terminal 15 coupled to an Element Management System ("EMS") 20, which includes an optimal time slot selection processor 25. EMS 20 further has communication links with each add/drop multiplier ("ADM") 30 in an OC-N optical facility 35, wherein the ADM 30 is a location where traffic is entered on and off the network.

A system user requests a T1, T3 or STS-3c service via terminal 15, for example, between termination point A and termination point B in facility 35. Terminal 15 communicates the request to EMS 20, which coordinates with processor 25 to establish path 40 between A and B. Processor 25 functions in accordance with the flow charts shown in FIGS. 2–4 and as described below. In general, processor 25 determines the optimal VT 1.5, STS-1 or STS-3c time slot location within each OC-N link. After time slot determination by processor 25, EMS 20 commands each ADM 30 to insert the T1, T3 or STS-3c signal into the selected VT 1.5, STS-1 or STS-3c time slot within each OC-N facility terminated by the particular ADM 30.

Figure 2:
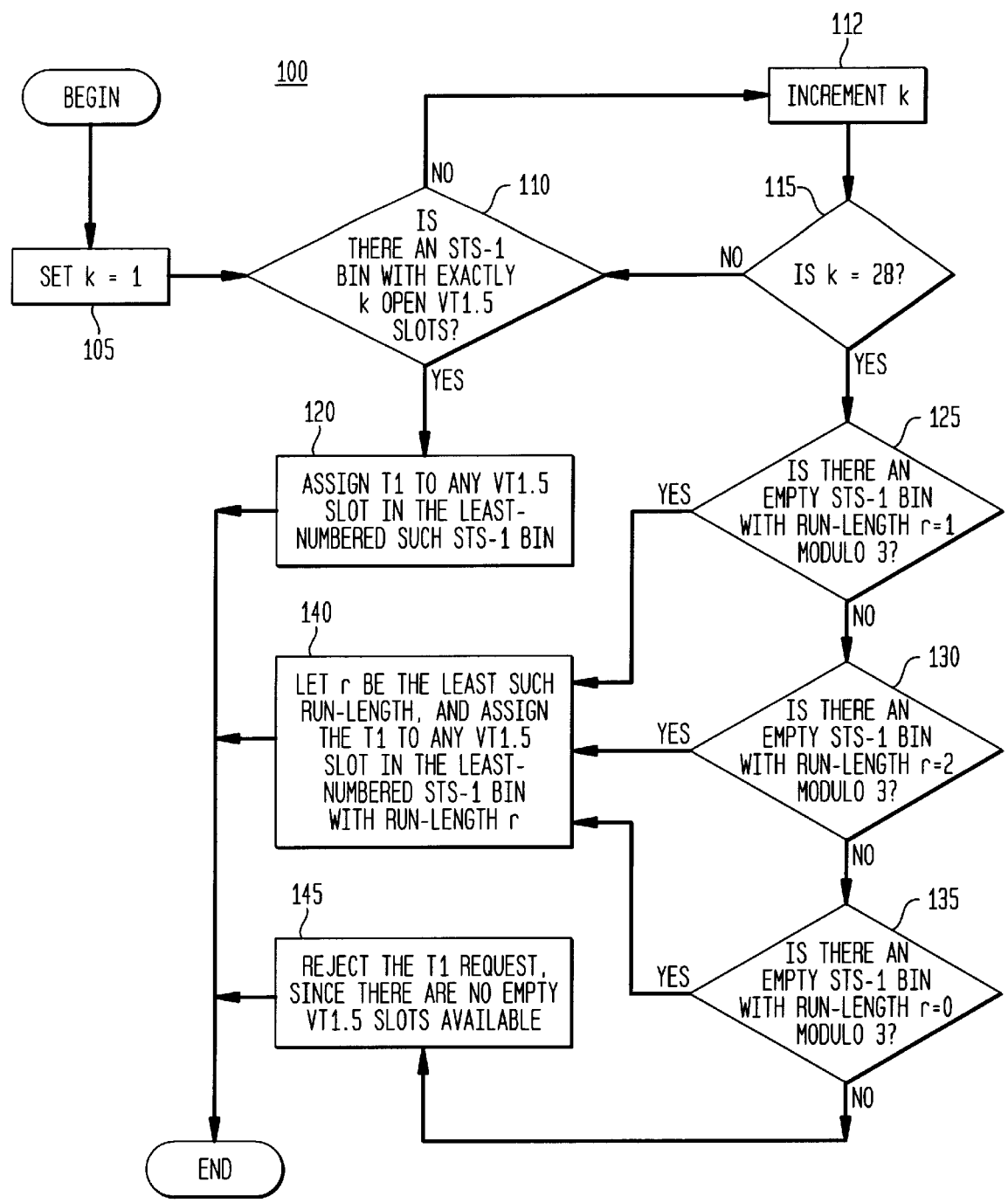
FIG. 2 is an illustrative flowchart for providing automatic path selection for a T1 service in accordance with the present invention.

Referring to FIG. 2, a flowchart 100 is shown which depicts an automatic path selection for a T1 facility or service request by a user. According to the present invention, the system will try to determine the most-fully occupied STS-1 time slot and will subsequently assign the T1 service to the available VT1.5 time slot in that STS-1 time slot. In general, the system accomplishes this by keeping track of $s_i$, which is the number of occupied VT1.5 time slots in the ith STS-1 time slot. When a T1 service request arrives, the T1 service is assigned to a time slot (e.g., this is typically the highest or lowest available time slot) of a STS-1 time slot i whose occupancy is maximal subject to $s_i<28$, which is the maximum number of VT1.5 time slots in a STS-1 time slot.

More specifically, in response to a T1 request, the system searches for an STS-1 time slot which has one available VT1.5 time slot (blocks 105, 110). If there does not exist an STS-1 time slot which contains only one VT1.5 time slot, the system will then search for an STS-1 time slot with two open VT1.5 time slots (blocks 112, 115). If the system is unsuccessful, this process is repeated until all N STS-1 time slots have been searched for k<28 open VT1.5 time slots, where k represents the current number of available VT1.5 time slots being searched for in the N STS-1 time slots (blocks 110, 112 and 115). Once the system selects the appropriate STS-1 time slot, the system will assign a VT1.5 time slot (normally this is the highest or lowest available time slot) in the selected STS-1 time slot (block 120). If there are multiple STS-1 time slots with k open VT1.5 time slots, then the system will select the least (or highest) numbered (i.e., smallest or largest i) STS-1 time slot and assign the T1 service to an VT1.5 time slot contained therein. However, if all partially occupied STS-1 time slots are fully assigned, then a new (i.e., previously unassigned) STS-1 time slot must be selected (block 125). This sequence assures that the most-fully occupied STS-1 time slots are used, e.g., those having the most VT1.5 time slots assigned to other services. Additionally, this sequence assures that the VT1.5 assignments are made in such a way that the STS-1 time slots are filled (or assigned) to VT1.5 time slots in systematic manner resulting in no unoccupied VT1.5 time slots. Thus, the present invention method prevents fragmentation and inefficient use of the available bandwidth.

If, as a result of the present invention, a new STS-1 time slot has to be assigned, then the system must maximize this selection with reference to T3 and STS-3c service requests. The system will select a new unassigned STS-1 time slot by determining which STS-1 time slot assignment will maximize the remaining STS-1 time slots for T3 and STS-3c assignments. The selection is made by selecting the STS-1 time slot which is located within the STS-1 run length having the optimum number of contiguous unoccupied STS-1 time slots (blocks 125–140). This selection process, which is explained in greater detail with reference to FIG. 3, further ensures bandwidth optimization and prevents bandwidth fragmentation. If no such STS-1 time slot is available, then the T1 assignment request will be rejected due to insufficient bandwidth available in the OC-N frame (block 145).

Note that by selecting the lowest (or highest) position number VT 1.5 time slot in the STS-1 time slot, the system again maximizes bandwidth utilization by efficient assignment. Note further that the choice of lowest or highest position number VT1.5 time slot is arbitrary. The lowest or highest selection simply determines the direction from which the STS-1 time slot is packed. In both cases the assignment is made to avoid fragmentation.

Figure 3:
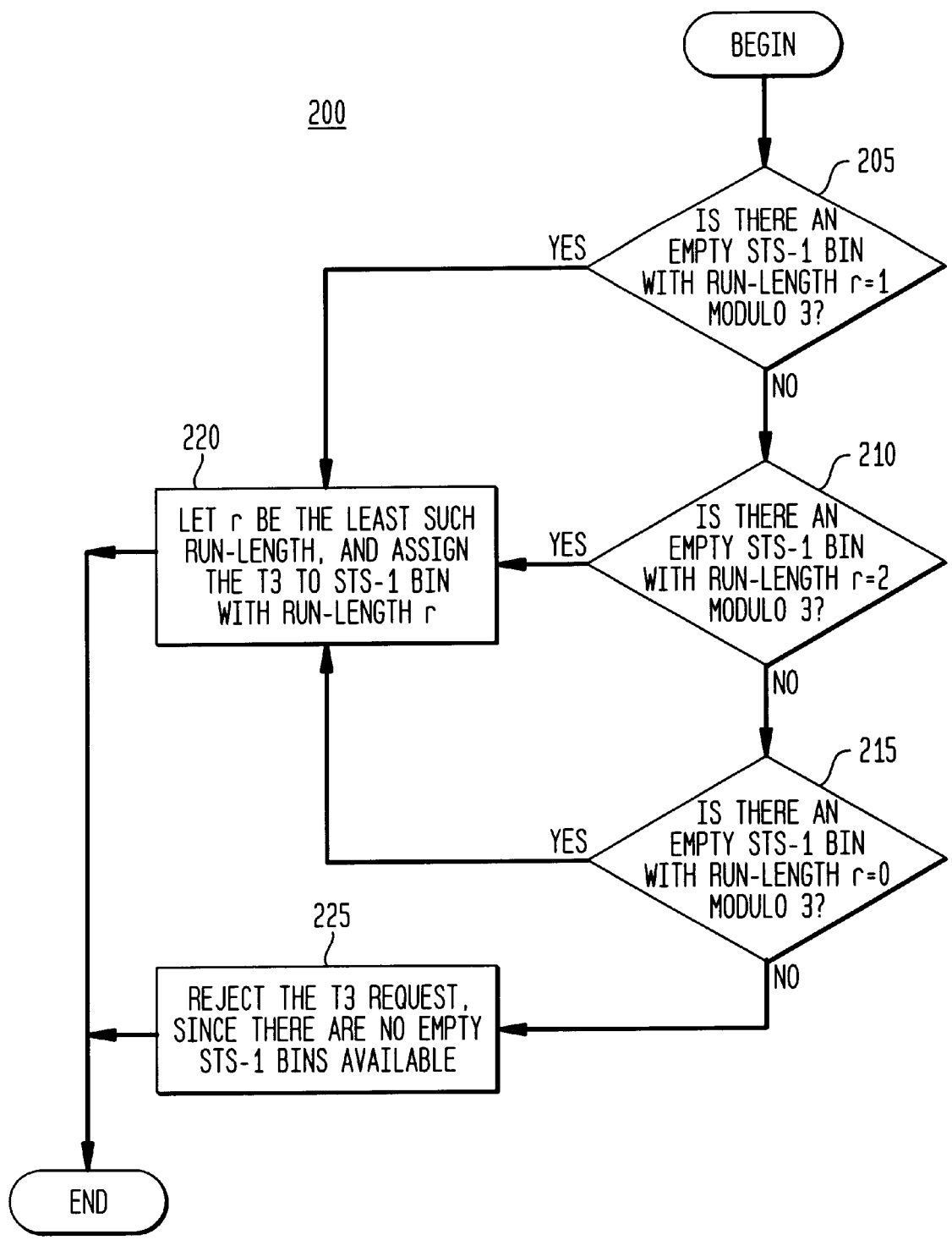
FIG. 3 is an illustrative flowchart for providing automatic path selection for a T3 service in accordance with the present invention.

Referring to FIG. 3, there is shown a flowchart 200 depicting an automatic path selection for a T3 facility or service request by a user. Note specifically, that a single STS-1 time slot is required to handle a single T3 service. This flowchart is also applicable to the selection of a new STS-1 time slot when no partially occupied STS-1 time slots exist. The system, in addition to T3 assignments, must analyze the additional impact of service requests for STS-3c time slots (e.g., services which require 3 contiguous or consecutive STS-1 time slots).

If an STS-1 time slot is needed in response to a T3 service request, the unassigned STS-1 time slot is selected according to what is termed the run length or $r_i$. For each STS-1 time slot i, the system keeps track of (or re-computes) a value $r_i$ which is defined as the number of STS-1 time slots in the run of consecutive unassigned STS-1 time slots to which STS-1 time slot i belongs. This is formally expressed as follows:

$$r_i := \max\{r: s_{j+1} = s_{j+2} = \ldots S_i \ldots = S_{j+r} = 0 \text{ for some } j,\ i-r \leq j < i\}$$

Thus, for example, $r_i=N$ for all i when the whole OC-N facility is empty. If STS-1 time slot i is not empty, $r_i$ is set to 0.

The system looks first for an STS-1 time slot i with $r_i=1$, that is, an empty STS-1 time slot with occupied STS-1 time slots on both sides. If the system finds such an STS-1 time slot or multiples thereof, it will assign the T3 service request to the least numbered (smallest i) STS-1 time slot. Otherwise, the system looks for STS-1 time slots i with $r_i=4$. As can be seen, the idea is to preserve runs of length 3 (or a multiple of 3) for use by STS-3c service requests. Thus, it would be inefficient to assign a STS-1 time slot which is part of a run length of 3. Note that a run length of 2 is not used at this time because it has the potential of becoming a run length of 3 when the adjacent time slot becomes available. However, a run length of 4 is generally utilizable since the left most or right most (i.e., the lowest or highest numbered) time slot can be assigned and still preserve the run length of 3.

More specifically, in response to a T3 service request, the system will first search for an available STS-1 time slot which has a run length r≡1 modulo 3 (block 205). That is, the system will search for an STS-1 time slot having run lengths of 1, 4, 7, 10, 13, . . . etc. If the system finds more than one such time slot, the system will select the least numbered time slot with that run length value (block 220). If the system is unsuccessful, it then searches for an STS-1 time slot having a run length of r≡2 modulo 3 (block 210). That is, the system will search for run lengths of 2, 5, 8, 11, 14 . . . etc. As before, a successful search will process the available STS-1 time slots by selecting the lowest numbered time slot (block 220). If there are still no available STS-1 time slots, the system will search for time slots having a run length of r≡0 modulo 3 (block 215). This corresponds to run lengths of 3, 6, 9, 12 . . . etc. If there are no unoccupied STS-1 time slots, then the T3 assignment or T1 assignment is rejected due to insufficient bandwidth within the OC-N frame (block 225).

The above selection process, by determining the number of contiguous STS-1 time slots, tends to ensure that the bandwidth fragmentation will not occur and thereby results in efficient utilization of the available bandwidth. Specifically, the system selects the first (lowest-numerical order) STS-1 time slot from the unassigned STS-1 run lengths according to a priority list of run lengths. That is, the first STS-1 time slot would be selected from a run length of size 1, if available. If a run length of size 1 STS-1 time slot is not available, the system searches for a run length of size 4 STS-1 time slot. This search is made until a run length shown in the priority list is found or until the end of the list, i.e., a run length of size 27, is reached. The priority list is ordered such that the optimum unassigned run lengths (of integral multiples of STS-1 time slot length) are selected first, such that the time slots are maximally-utilized. When there are no more run lengths available (due to prior assignment) of the currently-selected length in the priority list, the next length is selected from the list. This priority ordering of run length selection assures that the assignments, as before, are made in order of utilization so as to minimize fragmentation of bandwidth.

As more time slots are assigned to requested services, a point will be reached when only one additional T3 (or 28 additional T1) assignment(s) will be made by the selection method, and at that time, all of the available OC-N bandwidth will be maximally utilized, with no bandwidth fragmentation. That is, all of the OC-N frame's STS-1 and VT1.5 time slots will be assigned and there will be no unassigned time slots.

As noted previously, the method depicted in FIG. 3 must account for services which require 3 consecutive STS-1 time slots. An examination of the priority list reveals a subtle feature of the path selection methodology, which is designed to account for this complication. As shown, the T3 priority list uses the run lengths of 3, 6, 9, 12, 15, 18, 21, 24 and 27 as the last list entries. That is, the last run lengths to be chosen for T3 assignment are those having lengths that are factors of 3. The reason for this ordering of priority is to reserve length 3 run lengths for STS-3c assignments, which are designed to accommodate services requiring 3 STS-1 time slots. As can be seen, all of the possible run lengths having lengths equal to multiples of three STS-1 are reserved in this manner and are the last to be assigned. This reservation of length 3 run lengths assures the highest probability of actually having three consecutive time slots available at the time the STS-3c is to be assigned by not allowing these 3 STS-1 run lengths to be assigned earlier than necessary. Thus, the path selection method maximizes available bandwidth in terms of T1, T3 and STS-3c service assignments.

Assignment of STS-1 time slots for STS-3c service requests requires consideration of several factors. First, an assignment has to consider which STS-1 time slots should be utilized among a selected run length of available STS-1 time slots. For example, it would be inefficient to assign third, fourth and fifth time slots of a run of 6 or 7 available time slots. Such underutilization or inefficiency can be avoided by assigning STS-3c service requests to either end of the selected run length. Now suppose, for example, that an STS-3c is assigned to time slots i, i+1, and i+2 of a run consisting of time slots i through i+4. If time slot i−1 later becomes free, then the above assignment becomes non-optimal since two STS-3c service requests could have been assigned in time slots i−1 through i+4. This problem is minimized by requiring that assignments start from time slots 1, 2 and 3 or time slots N−2, N−1 and N. Advantageous consideration of this concept is achieved by assigning the STS-3c service request to the three rightmost (or highest) available time slots. If these are occupied, the system will then select the next three available time slots, namely, N−5, N−4 and N−3. This will be repeated until either the assignment is made or rejected due to insufficient bandwidth. If the other service requests are assigned from the left (i.e., smallest i), then by selecting time slots for STS-3c requests from the right (highest contiguous set of three time slots), the system assigns time slots from opposite ends in response to the type of service request. In situations where the end STS-1 time slots are not available, run lengths are used to determine which STS-1 time slots should be assigned to the STS-3c service request. In contrast to T3 assignments, the system first considers the r=0 modulo 3, then the r=1 modulo 3 and finally the r=2 modulo 3 run lengths.

Figure 4:
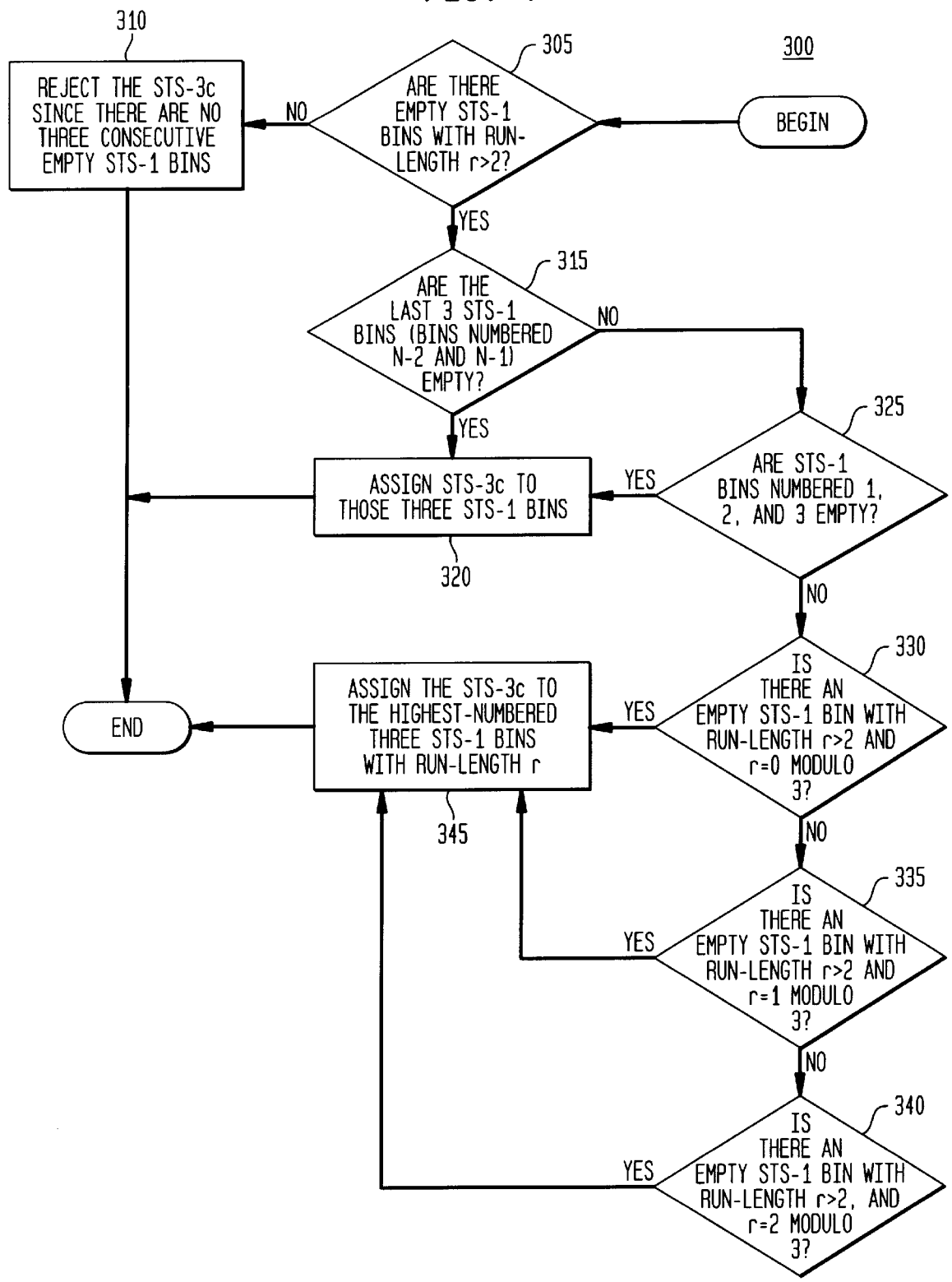
FIG. 4 is an illustrative flowchart for providing automatic path selection for a STS-3c service in accordance with the present invention.

Referring to FIG. 4, a flowchart 300 illustrates the path selection methodology for an STS-3c service request. Upon receiving such a request, the system initially determines if there are 3 consecutive unoccupied STS-1 time slots (block 305). As before, if there are no available STS-1 time slots, noting that 3 consecutive STS-1 time slots are required, then the assignment will be rejected due to insufficient bandwidth in the OC-N frame (block 310). If the system determines that the STS-1 time slots exist, it then determines if the last three STS-1 time slots are available (block 315). That is, the system checks the availability of the N−2, N−1 and N STS-1 time slots and if unoccupied, the system will assign them to the STS-3c service request (block 320). If the high end numbered time slots are not available, the system will then check the availability of the low end numbered STS-1 time slots (block 325). If these are available, the system will make the subsequent assignment (block 320). If neither end STS-1 time slots are available, the system will select in accordance with the run length strategy employed for T3 assignments. However, the order of the run lengths is modified. The system will first check if STS-1 time slots are available having run lengths of 3, 6, 9, . . . etc. (block 330). If the system finds more than one such group of STS-1 time slots, the system will select the highest numbered time slot with that run length value (block 345). If the system is unsuccessful, it then searches for an STS-1 time slot having run lengths of 4, 7, 10, 13 . . . etc. (block 335). As before, a successful search will process the available STS-1 time slots by selecting the highest numbered time slot (block 345). If these are still no available STS-1 time slots, the system will search for time slots having a run length 5, 8, 11, 14 . . . etc. (block 340). Again, if there are multiple available STS-1 time slots, then the STS3c assignment will be made to the highest such run length (block 345). As noted previously, the reservation of length 3 and multiple of length 3 run lengths by the special priority list ordering (described above) assures the maximum probability of having three consecutive STS-1 time slots available for the STS-3c assignment.

Whereas the methodology was described with reference to an end-to-end SONET network, the present invention system and method is also applicable to networks containing ring provisioning features. These type of systems pre-allocate time slots within the optical facilities comprising the SONET ring when an assignment is to be made. To effectively utilize automatic path selection with a ring provisioning feature, the present invention system must be applied to each optical facility comprising a ring to assure that fragmentation will not occur at each optical facility. However, in general, the present invention will be applied to each optical facility in which a time slot assignment is required, including the optical or electrical interconnects between the individual rings of a dual ring network. In applications where the same time slot is utilized all the way around the ring (such as unidirectional rings), automatic path selection will be used to select the time slot, and that time slot replicated for the entire ring.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for automatically selecting a transmission path in a communications network to avoid bandwidth fragmentation, the communications network having a first plurality of time slots, each of said time slots including a corresponding second plurality of time slots, the method comprising the steps of:

identifying a type of service request;

determining an available maximally utilized time slot from said first plurality of time slots, at least one of said corresponding second plurality of time slots having sufficient space to accommodate transmission of said type of service request;

assigning said maximally utilized time slot to said service request;

determining from said first plurality of time slots an unoccupied time slot having an optimum number of contiguous unoccupied time slots, wherein said optimum number maximizes an assignable remainder of said first plurality of timeslots, when said maximally utilized time slot is unavailable; and assigning said unoccupied time slot to said service request to provide said transmission path.

2. The method according to claim 1, wherein said step of determining said maximally utilized time slot includes the step of searching through said first plurality of time slots to determine a most occupied time slot within said first plurality of time slots.

3. The method according to claim 2, wherein an endpoint time slot in said most occupied time slot is assigned to said service request.

4. The method according to claim 3, wherein said endpoint time slot is a lowest number time slot in said most occupied time slot.

5. The method according to claim 2, wherein said step of determining said maximally utilized time slot includes the step of selecting a most occupied time slot at an endpoint when an occurrence of said most occupied time slot exists more than once.

6. The method according to claim 5, wherein said endpoint most occupied time slot is a least numbered time slot.

7. The method according to claim 2, wherein said step of searching includes the step of incrementally looking through said first plurality of time slots to find said most occupied time slot.

8. The method according to claim 2, wherein said unoccupied time slot is selected in accordance with a prioritized order of the number of contiguous unoccupied time slots.

9. The method according to claim 8, wherein said prioritized order is a plurality of run lengths of contiguous unoccupied time slots.

10. The method according to claim 8, wherein said prioritized order places the value of three contiguous unoccupied time slots and multiples thereof at a bottom of said prioritized order.

11. The method according to claim 9, wherein said prioritized order is run length=1 modulo 3, run length=2 modulo 3 and run length=0 modulo 3.

12. The method according to claim 8, wherein said prioritized order is initialized at a value of three contiguous unoccupied time slots.

13. The method according to claim 1, wherein said unoccupied time slot is selected in accordance with a prioritized order of the number of contiguous unoccupied time slots.

14. The method according to claim 13, wherein said prioritized order starts from a run length of 1 modulo 3.

15. The method according to claim 1, wherein said service request is selected from a group consisting of a T1, a T3 and STS-3c service request.

16. The method according to claim 15, wherein said step of determining said unoccupied time slot includes, when said type of service request is a T1 service request, the step of:

selecting said unoccupied time slot in accordance with a prioritized order of the number of contiguous unoccupied time slots.

17. The method according to claim 15, wherein said step of determining said unoccupied time slot includes, when said type is a T3 service request, the step of:

selecting said unoccupied time slot in accordance with a prioritized order of the number of contiguous unoccupied time slots.

18. The method according to claim 15, wherein said step of determining said unoccupied time slot includes, when said type is a STS-3c service request, the steps of:

verifying if a block of three unoccupied time slots exist for assignment to said STS-3c service request;

assigning an end set of three unoccupied time slots to said STS-3c service request if said end set is available; and searching for said block in accordance with a prioritized order of the number of contiguous unoccupied time slots when said end set is not available.

19. The method according to claim 1, wherein said step of determining an unoccupied time slot includes the steps of:

verifying if a block of three unoccupied time slots exist in response to said service request;

assigning an end set of three unoccupied time slots to said service request if said end set is available; and searching for said block in accordance with a prioritized order of the number of contiguous unoccupied time slots when said end set is not available.

20. The method according to claim 19, wherein said prioritized order of the number of contiguous unoccupied time slots is said time slots having run lengths of 3, 6, 9, 12, . . . ; then said time slots having run lengths of 4, 7, 10, 13, . . . ; then said time slots having run lengths of 5, 8, 11, 14 . . .

21. A system for automatically selecting a transmission path in a TDM communications network to optimize bandwidth availability, said system comprising:

an interface unit for inputting a given set of service parameters; and a processor for identifying a type of service request from said service parameters;

said processor operable to determine a maximally utilized time slot having capacity to transmit said service request, to determine an unoccupied time slot having an optimum number of contiguous unoccupied time slots wherein said optimum number maximizes an assignable remainder of said unoccupied timeslots when said maximally utilized time slot is unavailable, to assign said maximally utilized time slot to said service request when said maximally utilized time slot is available and to assign said unoccupied time slot to said service request when said maximally utilized time slot is unavailable so as to provide said transmission path.

22. The system according to claim 21, wherein said processor, when said service request requires a T1 service, further includes:

means for searching for a most occupied time slot and designating an endpoint time slot within said most occupied time slot to said T1 service; and means for selecting said unoccupied time slot in accordance with a prioritized order of the number of contiguous unoccupied time slots when said most-occupied time slot is unavailable.

23. The system according to claim 21, wherein said processor, when said service request requires a T3 service, further includes:

means for searching for said unoccupied time slot; and means for selecting said unoccupied time slot in accordance with a prioritized order of the number of contiguous unoccupied time slots when said unoccupied time slot is available.

24. The system according to claim 23, wherein said unoccupied time slot is a block of three contiguous unoccupied time slots when said service request requires a STS-3c service.

25. The system according to claim 19, wherein said processor determines said maximally utilized time slot with respect to a T1 service request, a T3 service request and a STS-3c service request.

26. The system according to claim 19, wherein said type of service request is selected from the group consisting of a T1 type of service request, a T3 type service request and a STS-3c type of service request.

27. A method for automatically selecting in response to a type of service request, a transmission path in a communications network to optimize bandwidth utilization, the communications network including numbered sets of time slots, comprising the steps of:

determining availability of a time slot having accommodation for said type of service request;

assigning using a two-fold slot selection process said time slot to said service request to provide a transmission pathway, said assigning step including the steps of:

selecting a least numbered unoccupied time slot in response to a T1 and T3 service request; and picking a highest numbered set of three contiguous unoccupied time slots in response to an STS-3c service request.

28. The method according to claim 27, wherein the step of selecting includes the steps of:

looking incrementally through a plurality of time slots for a most occupied time slot; and searching for said unoccupied time slot with respect to a first prioritized order of run lengths of a number of contiguous unoccupied time slots if said most unoccupied time slot is unavailable.

29. The method according to claim 28, wherein the step of picking includes the steps of:

assigning an end set of three contiguous unoccupied time slots; and searching for a set of three contiguous unoccupied time slots with respect to a second prioritized order of run lengths of a number of contiguous unoccupied time slots if said most end set is unavailable.

* * * * *